United States Patent
Rowe

(10) Patent No.: US 6,554,006 B2
(45) Date of Patent: Apr. 29, 2003

(54) PIPING DEPOSIT REMOVAL FROM STATOR WATER COOLING SYSTEMS

(75) Inventor: Raymond Grant Rowe, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 09/742,306

(22) Filed: Dec. 22, 2000

(65) Prior Publication Data

US 2002/0078975 A1 Jun. 27, 2002

(51) Int. Cl.[7] .............................. B08B 9/02; C23G 1/02
(52) U.S. Cl. ................................ 134/22.11; 134/22.14; 134/22.19; 134/28; 134/41
(58) Field of Search ............................ 134/22.11, 22.18, 134/22.12, 22.16, 22.17, 22.19, 22.1, 41, 3, 28

(56) References Cited

U.S. PATENT DOCUMENTS

| | | | |
|---|---|---|---|
| 3,898,042 A | * 8/1975 | Webb et al. ................. 366/273 |
| 4,181,536 A | 1/1980 | Keyworth et al. |
| 4,238,244 A | * 12/1980 | Banks ...................... 134/22.18 |
| 4,430,129 A | 2/1984 | Gamer |
| 4,452,643 A | 6/1984 | Martin et al. |
| 4,720,306 A | 1/1988 | Emmert et al. |
| 4,789,406 A | 12/1988 | Holder et al. |
| 5,154,197 A | * 10/1992 | Auld et al. ..................... 134/1 |
| 5,466,297 A | 11/1995 | Goodman et al. |
| 5,841,826 A | * 11/1998 | Rootham et al. ............ 122/382 |

FOREIGN PATENT DOCUMENTS

| | | |
|---|---|---|
| CA | 2207406 | 12/1997 |
| DE | 19623390 | 1/1998 |
| FR | 2765720 | 1/1999 |
| GB | 963327 | 7/1964 |
| WO | WO 99/43070 | 8/1999 |

OTHER PUBLICATIONS

"*Experience with Water–Cooled Generator Stator Windings Copper Corrosion*", GEC Alsthom Company, C. Guillaumin, E. Rakotonarivo, M. Berlamont, Tampa, Florida, Nov. 18–20, 1996 Conference EPRI.

"*EDF/GEC Alsthom Experience with Treatment of the Cooling Water Circuit of Generator Stators*" C. Guillaumin et al., EPRI Workshop, Jun. 5–6, 1995, The Ritz Carlton Hotel, Atlanta, GA.

\* cited by examiner

Primary Examiner—Randy Gulakowski
Assistant Examiner—Saeed Chaudhry
(74) Attorney, Agent, or Firm—Banner & Witcoff, Ltd.

(57) ABSTRACT

The present invention provides a method of removing copper oxide deposits from stator water cooling system piping material surfaces. The present invention disconnects the generator from the stator water cooling system, connects bridging piping to the stator water cooling system at the points from which the generator was disconnected to allow the stator water cooling system to operate without the generator, provides a sufficient amount of an aqueous solution of an agent which dissolves or removes copper oxide deposits from piping material surfaces for a time sufficient to dissolve or remove substantially all copper oxide deposits, and rinses the piping material surfaces with sufficient water until the output water from the rinsing of the piping material surfaces is essentially neutral.

12 Claims, 4 Drawing Sheets

PIPING DEPOSIT REMOVAL FROM STATOR WATER COOLING SYSTEMS

BACKGROUND

This invention relates to a method of cleaning stator water cooling systems that can be used to cool stator bars contained in the generators of electrical power plants.

In electrical power plants, high density current is passed through generator stators, thus causing the stators to be heated. In order to control this heating, the stators are constructed of a network of stator strands in which hollow cooper conductors are placed, through which circulates cooling water. Cooling water may be provided by a stator water cooling system (SWCS) connected to the generator. A typical SWCS connected to a generator is shown in FIG. 1. As shown in FIG. 1, a typical SWCS 2 is composed of many parts. First there is a high-temperature area of the SWCS 8 containing in part stator bars, rectifiers and reservoir tanks. The high-temperature area of a typical SWCS is the region of the SWCS into which the water flows from the generator prior to contacting the heat exchanger 4. After the water leaves the high-temperature area, it passes through heat exchangers and into the low-temperature area 5 of the SWCS. The low-temperature area of a typical SWCS contains in part, make-up water systems 6 and 7. A typical SWCS is connected to a generator 3 by connectors 1.

The formation of deposits on the internal walls of the hollow copper conductors is a frequently encountered problem. This formation of copper oxide (CuO) deposits causes numerous problems in electrical power plants. Not only can it lead to obstruction of the hollow copper conductors, but the heated water in the copper conductors can partially dissolve the CuO deposits until saturation is achieved, thereby providing a saturated aqueous solution of copper oxide to the SWCS. Additionally, fine particulates of undissolved copper oxide, deposited by the cooled water in the low-temperature area of the SWCS can be removed from the low-temperature area interior piping material surfaces by the subsequent flow of water and transported into the strainers of the SWCS. The SWCS pumps this saturated, aqueous solution of copper oxide through the low-temperature section of the SWCS (the section located after the heat exchangers and before the connecting means to the generator) and into the strainers.

This saturated aqueous solution of copper oxide passes through strainers in the low-temperature section of the SWCS. CuO particles are deposited on these strainers by the aqueous solution thus facilitating the growth of copper oxide crystals on the strainer, thereby leading to the strainer's plugging and substantially impeding the flow of water to the generator. Growth of CuO crystals on the strainers leads to decreased flow of water through the generator, thereby causing a heating of the generator's stators and in the long run, to numerous extended generator down-times or to decreases in charging.

One attempted solution to this problem has used on-line demineralization circuits. This technique, however, uses additional expensive ion-exchange resins to remove the copper cations from the water. Other attempted solutions require the complete system (the SWCS and the generator) to be periodically stopped and the copper conductors cleaned using acid solutions and/or complexing solutions, thereby leading to increased corrosion rates in the hollow copper conductor tubes. All of the current methods of removing CuO deposits from SWCS contain the additional undesired feature of removing the protective CuO layer from the stator strands, thereby risking the development of unstable CuO surfaces. Unstable CuO surfaces on the stator strands promote the development of the CuO deposits in the low temperature area of the SWCS thereby leading to an increase in the plugging rate for SWCS strainers.

Thus, there exists a need for a method that makes it possible to control the formation and/or allows the elimination of deposits responsible for the obstruction of the strainers in stator water cooling circuits operated in aerated mode while maintaining the protective CuO oxide layer on the stator water cooling strands. Such a method must not result in an extended down-time of the generator, must not require expensive demineralization circuits, must not generate high conductivities at the cooling water level and must not cause a high degree of corrosion of the hollow copper pipes.

SUMMARY OF THE INVENTION

This invention is directed to a method of removing deposits from stator water cooling system piping thereby preventing strainer plugging. In particular, this method removes the copper oxide deposits from stator water cooling system piping surfaces, thereby eliminating the source of particulates that enable nucleation of crystal growth on strainer mesh.

The method of the invention removes copper oxide deposits from SWCS piping material surfaces by disconnecting the generator from the SWCS and connecting bridging piping to the SWCS at the points from which the generator was disconnected, allowing the SWCS to operate without the generator. Then, a sufficient amount of an agent that dissolves or removes copper oxide deposits from said piping material surfaces is flowed through the SWCS for a time sufficient to dissolve or remove substantially all copper oxide deposits without removing the protective oxide coating from the water-cooled stator strands. Finally, the piping material surfaces are rinsed with sufficient water until the output water from the rinsing of the piping material surfaces is essentially neutral. Preferably, the agent is an acidic aqueous solution.

DETAILED DESCRIPTION

The method of the present invention removes CuO particles from the surfaces of piping components of SWCS so that strainers, whose function in stator water cooling systems is to prevent debris from passing into the generator windings of oxygen saturated water cooled generators, are not obstructed by crystal formations of CuO. Crystal formations of CuO on the strainers of SWCS occurs when fine CuO nuclei, removed from the piping component surfaces, attach themselves to the strainer mesh. Strainers can become plugged by such deposition of CuO on the surface of the stainless steel strainer mesh. When a strainer is plugged, generators trip and an outage can occur at a power plant employing a SWCS.

Figure 1:
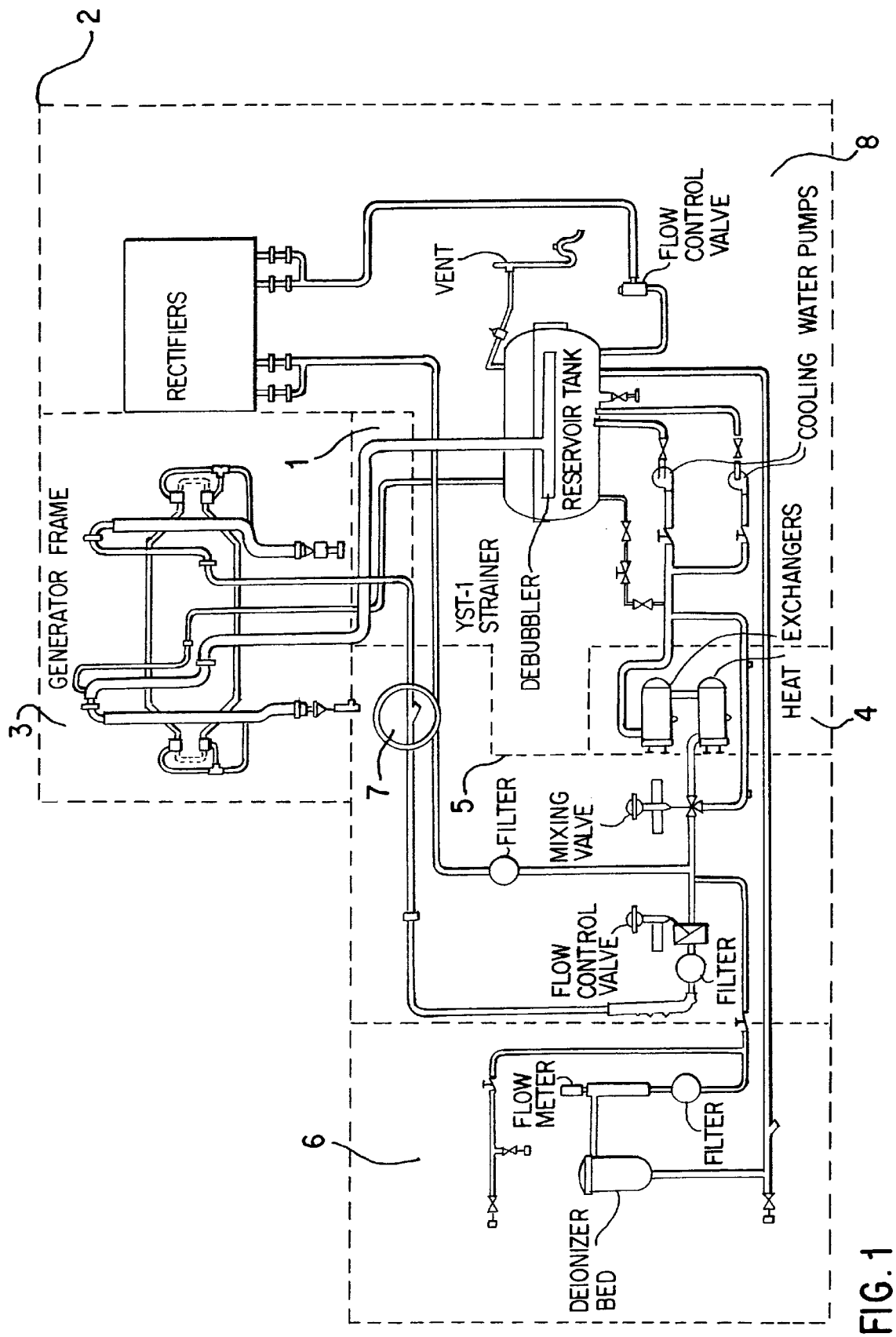
FIG. 1 is a SWCS attached to connection means which are attached to a generator.
Figure 2:
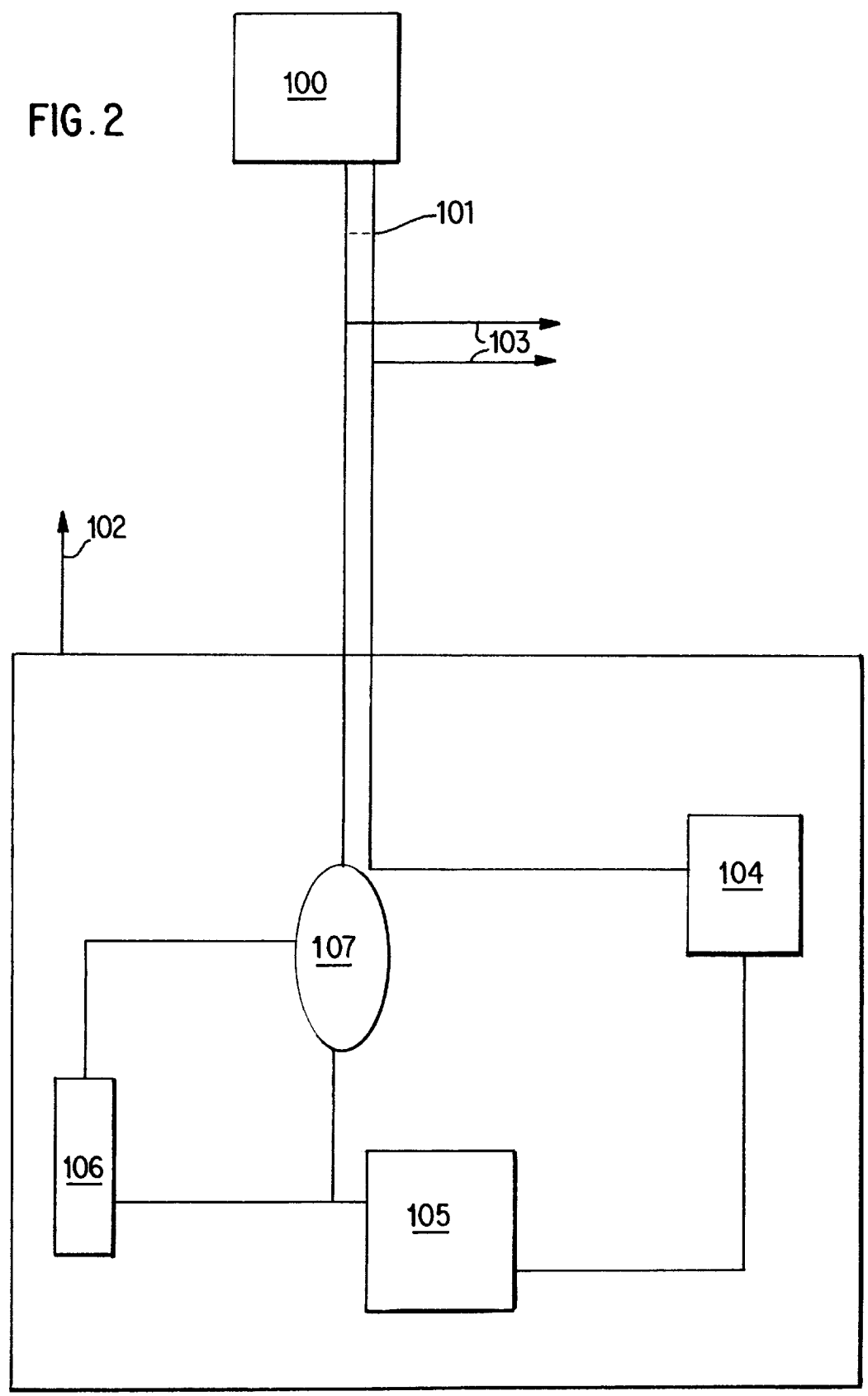
FIG. 2 is a simplified diagram of a SWCS connected to a generator by connecting means.

A simplified diagram of a typical SWCS is shown in FIG. 2, where it can be seen that a SWCS 102 can be connected to a generator 100 or bridging piping 101 by connectors 103. Contained within the SWCS of FIG. 2 are a high-temperature area 104, heat exchangers 105, make-up water systems 106, and strainers 107.

As one embodiment shown by FIG. 2, strainers 107, typically are located in the low-temperature portion of the SWCS just prior to the generator 100 or bridging piping 101. The low-temperature section of the SWCS (the section of the SWCS located between the heat exchangers and the generator), is characterized by similar physical and structural properties, namely that during normal operation of the SWCS, the concentration of CuO particles in this area can reach a point so that the water present in this section is supersaturated with CuO. CuO deposits are also believed to be most prevalent in the low-temperature section of the SWCS. These deposits can usually be seen on the interior of piping material surfaces. It is believed that these CuO deposits are the source of the fine CuO particulates that are deposited on the strainer mesh and which later are the source of CuO crystal nucleation and growth.

Piping material surfaces are herein defined to the surfaces of all structures, valves, pumps, pipes, connectors, or other similar components except for the header and copper components inside the generator that make up the system through which water flows in the SWCS.

Generally, SWCS that exhibit a high occurrence of strainer plugging have a high concentration of fine CuO particulates in the water located in the low temperature section of the SWCS. The present invention provides a method of modifying SWCS so that regardless of whether the water is saturated with CuO at the strainer, CuO crystals do not plug SWCS strainers in the time interval between scheduled outages.

Figure 3:
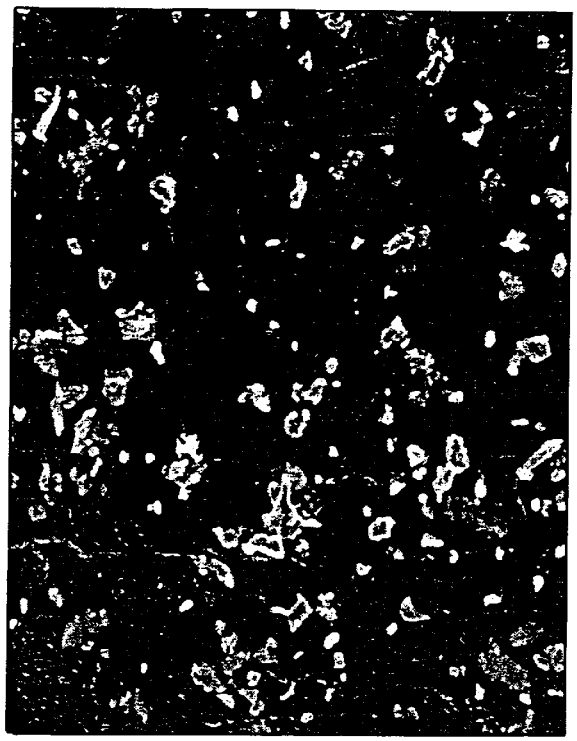
FIG. 3 is a SEM micrograph at a magnification of 750× of the upstream side of strainer mesh in the low-temperature section of the SWCS.
Figure 4:
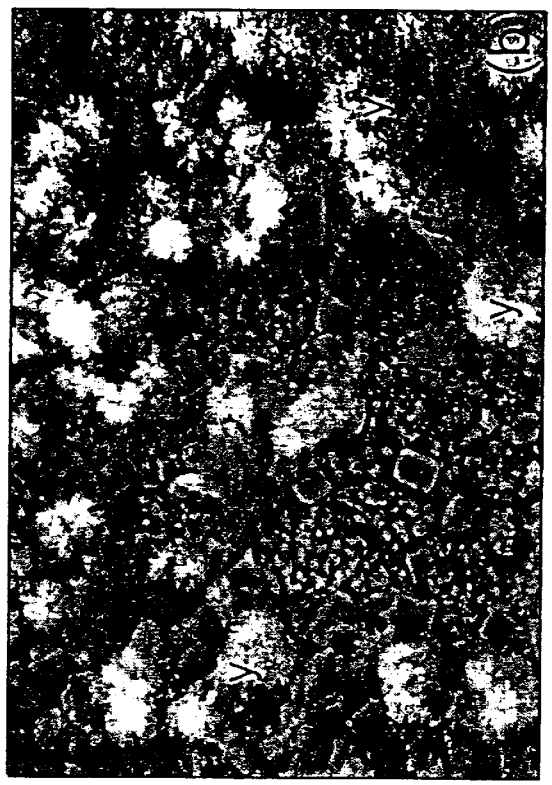
FIG. 4 is a SEM micrograph at approximately 2000× of the same strainer mesh as FIG. 3.
Figure 5B:
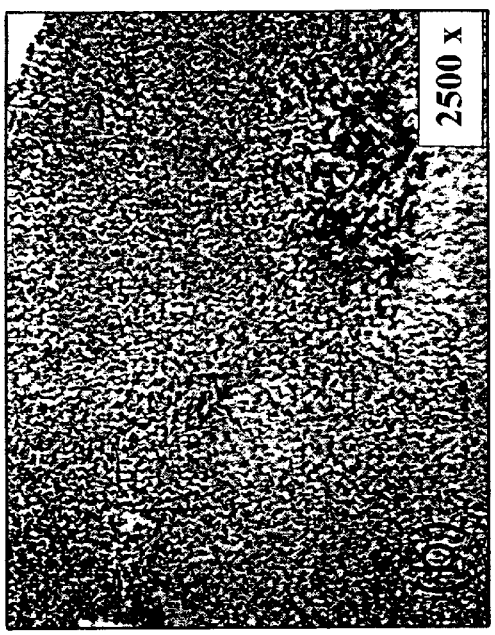
FIG. 5 are a series of SEM micrograph showing the morphology of copper oxide crystals on a SWCS strainer at magnifications of (a) 15×, (b) 2500×, and (c) 3400×.
Figure 5A:
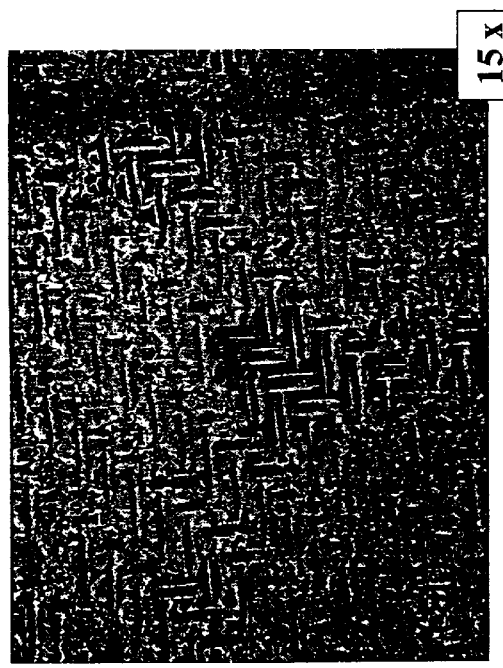
Figure 5C:

Fine CuO particulates generally have a diameter less than about 5 $\mu$m. These fine CuO particulates form crystals which are believed to have a needle or knife-like morphology. FIG. 3 shows a strainer mesh containing CuO particulates ranging from 1–4 microns. FIG. 4 shows that crystal growth on the strainer is restricted to the areas on which fine CuO particulates have been deposited. FIG. 5 shows the morphology of the crystals plugging a SWCS strainer at different magnifications. This morphology on plugged strainers demonstrates that the actual plugging of strainers occurs by crystal growth from a deposit of a fine CuO particle on the strainer mesh from a solution having a supersaturation of CuO during the operation of the SWCS. Crystal formation is believed to require nucleation and growth. While not restricting themselves to a particular theory, it is believed that crystal growth rate is proportional to water flow rate over a designated area.

Current SWCS have tried to remove CuO particles from the water supersaturated with these particles by filtration. However, while filtration removes large CuO particles, it is ineffective in removing the fine CuO particles that are the seeds of the CuO crystal growth on the strainers. Since removal of fine CuO particles from the supersaturated water solution has proven to be an ineffective method of preventing plugging of SWCS strainers, the source of the nucleation sites, (i.e. the source of the fine CuO particles) must be eliminated. Since the source of the fine CuO particles is believed to be any internal surface of any piping material, CuO deposits on the interior surface of these piping materials must be substantially eliminated or prevented from forming.

The present invention provides a method for substantially eliminating CuO deposits on the interior surface of piping materials without requiring the entire generator to be off-line (shut-down) for extended periods of time. Moreover, the method does not expose the generator, especially the hollow copper conductors, to corrosion rate enhancing chemicals nor requires the use of ion-exchange resins.

Referring to FIG. 2, the SWCS 102 is disconnected from the generator 100 and connected to bridging piping 101 though connection 103. That is, the bridging piping 101 replaces the generator 100 so that the SWCS can operate without the generator. Any means known to those of ordinary skill can be used to implement this first step. For example, the connector used between the SWCS and the generator can be detached from the generator and subsequently attached to the bridging pipe. In this example, the connector from the SWCS to the generator can be further supplemented with an apparatus that connects the connector to the bridging piping. Alternatively, the connector between the SWCS and the generator can be detached from the SWCS and a connector permanently attached to the bridging piping is attached to the SWCS. Connectors as used above are well known to those of ordinary skill and thus not depicted in the figure. Suitable connectors include, but are not limited to, a pipe or other such conduit used to transport fluid materials from one device to another.

After the connector is attached to both the bridging piping and the SWCS, the SWCS can be flushed with an agent that dissolves or otherwise removes CuO from the interior surface of piping materials. The agent can be introduced at any point within the SWCS. Preferably the agent is introduced at a location in the SWCS where other fluid materials are added to avoid additional equipment. In FIG. 2, an example of a preferred introduction point is the make-up water tank 106. The agent can be introduced to the SWCS by any device known to one of ordinary skill such as, but not limited to, a tank of concentrated agent connected to the make-up water via a connector. The tank of concentrated agent is introduced to the make-up water tank by opening a valve.

The flushing may occur by any means known to those of ordinary skill. Moreover, a more concentrated volume of an acid may be used to flush the system than what is used for removing CuO from the interior surfaces of piping materials, to the make-up water tank. The water that remains in the water tank can be used to dilute the concentrated acid until the desired concentration is achieved. The means of supplying the make-up water to the SWCS can be employed to provide the aqueous solution of acids or other agents to the SWCS.

Examples of agents that dissolve or otherwise remove CuO from the interior surface of piping material surfaces include solutions of mineral acids (such as sulfuric, hydrochloric, or phosphoric), other oxidants (such as EDTA, potassium bichromate, or ammonium peroxydisulfite), and combinations thereof. Preferably, a solution of mineral acids is used. Even more preferably the solution of mineral acids is a phosphoric acid solution.

The amount of the agent necessary is easily determined by one of ordinary skill. The amount of the agent provided to clean the interior surfaces of the piping material is at a concentration, and is flushed through the system for a time sufficient, to remove substantially all the CuO particles from the interior surfaces of piping material. The concentration and time are dependent on the exact configuration of the actual SWCS, the interior surface area of the piping materials, and the mass of the CuO deposits found within the SWCS. Generally, the concentration of agent introduced to the SWCS in the present invention is greater than the concentration of the same agent (e.g., acid) used in the prior art method of flushing the entire system, including the generator containing the hollow copper tubes. For instance if phosphoric acid is used, preferably the concentration is greater than about 9% by volume. More preferably, the concentration is greater than about 10% by volume. Even more preferably, the concentration is greater than about 11% by volume. Most preferably, the concentration is greater that about 15% by volume.

A greater concentration of an agent can be used in the method of the present invention than the concentration used in current cleaning systems because the risk of post-cleaning corrosion instability of copper generator strands is substantially eliminated. Further, more aggressive agents can be used because the risk of post-cleaning corrosion instability of copper generator strands is substantially reduced in the method of the present invention. These more aggressive agents are within the ordinary skill of the artist, but are not currently employed due to the above-described corrosion risk.

After cleaning with the agent, the SWCS is flushed with sufficient water until the output from the SWCS is essentially at a neutral pH and substantially all of the agent is removed from the system. After the low-temperature section of the SWCS has been cleaned with the agent, either prior to or after the flushing of the SWCS with water, the SWCS may be inspected for deposits. If deposits remain, the SWCS can be re-cleaned by flushing with the same or different agent.

Then the bridging piping is disconnected from the SWCS and the SWCS is reconnected to the generator. Thereafter, the system may be filtered with cotton filter media, preferably, the finest available, to substantially remove any remaining CuO particles. The preferred cotton filter media has a pass-size from about 3 to about 5 microns.

The method of the present invention is not to be limited to the above-described preferred embodiments. The inventors of the present invention recognizes that numerous means of piping and connection, identity and concentration of acids or other agents, and means of supplying the aqueous solution of acids or other agents are known to those of ordinary skill and the above disclosure is meant to encompass all of these variations whether currently known or practiced.

I claim:

1. A method of removing copper oxide deposits from piping surfaces of stator water cooling systems connected to an electrical generator while maintaining the protective stable copper oxide layer on the stator strands of the generator, said method comprising:
   a) disconnecting the generator from the stator water cooling system,
   b) connecting bridging piping to the stator water cooling system at the points from which the generator was disconnected so the stator water cooling system operates without the generator,
   c) introducing into the stator water cooling system a sufficient amount of an agent which dissolves or removes copper oxide deposits from said piping surfaces, for a time sufficient to dissolve or remove substantially all copper oxide deposits, and
   d) rinsing said piping surfaces with sufficient water until the output water exiting the stator water cooling system is essentially neutral.

2. The method of claim 1 further comprising inspecting the piping surfaces for deposits and repeating steps (c) and (d) if deposits remain.

3. The method of claim 1 further comprising disconnecting the bridging piping and reconnecting the generator to the stator water cooling system at the points that said bridging piping was removed.

4. The method of claim 1 wherein said agent comprises an aqueous solution of at least one acid.

5. The method of claim 4 wherein said acid comprises one or more mineral acids.

6. The method of claim 5 wherein said mineral acid is phosphoric acid.

7. The method of claim 6 wherein the aqueous solution has a concentration of at least 9% phosphoric acid by volume.

8. The method of claim 6 wherein the aqueous solution has a concentration of at least 10% phosphoric acid by volume.

9. The method of claim 6 wherein the aqueous solution has a concentration of at least 11% phosphoric acid by volume.

10. The method of claim 6 wherein the aqueous solution has a concentration of at least 15% phosphoric acid by volume.

11. The method of claim 1 further comprising filtering water flowing through the stator water cooling system with a cotton media filter after reconnecting the stator water cooling system to the generator.

12. The method of claim 11 wherein said cotton media filter has a pass size from about 3 to about 5 microns.

* * * * *